United States Patent
Yasue et al.

(10) Patent No.: US 6,611,409 B1
(45) Date of Patent: Aug. 26, 2003

(54) LINE MODULE PROTECTION METHOD AND DEVICE UTILIZING SAID METHOD

(75) Inventors: Kazuhito Yasue, Kawasaki (JP); Mikio Nakayama, Kawasaki (JP); Takashi Nara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/612,699

(22) Filed: Jul. 10, 2000

(30) Foreign Application Priority Data

Aug. 12, 1999 (JP) ............................................ 11-228875

(51) Int. Cl.$^7$ ................................................ H02H 3/00
(52) U.S. Cl. ........................... 361/67; 307/23; 307/64; 307/80; 307/85; 370/216; 340/2.1; 340/2.23; 340/825.01
(58) Field of Search ............................... 361/62–64, 67; 307/38, 39, 139, 140, 125, 126, 130, 131, 132 E, 85, 86; 340/651, 653, 825.01, 825.18, 827, 2.23, 825.02, 2.1, 2.27; 370/225–228, 220, 16

(56) References Cited

U.S. PATENT DOCUMENTS 3,614,401 A * 10/1971 Lode ........................... 235/153
5,014,261 A * 5/1991 Shinbashi et al. ........... 370/220
5,341,509 A * 8/1994 Takashima ................... 710/317
5,901,024 A * 5/1999 Deschaine et al. ............ 361/67

* cited by examiner

*Primary Examiner*—Brian Sircus
*Assistant Examiner*—Isabel Rodriguez
(74) *Attorney, Agent, or Firm*—Katten Muchin Zavis Rosenman

(57) ABSTRACT

The present invention relates to a line module protection method and a device utilizing that method. According to the line module protection method of the present invention, line module protection is performed by switching the connection from a broken line accommodating module to an auxiliary module. A plurality of line accommodating modules are included in a line accommodating unit connected to the lines in a network. The plurality of line accommodating modules are divided into a plurality of groups, and the auxiliary module is placed substantially at the same distance from all the groups. Thus, a large number of line accommodating modules for performing line module protection can be employed with one auxiliary module.

8 Claims, 19 Drawing Sheets

LINE MODULE PROTECTION METHOD AND DEVICE UTILIZING SAID METHOD

BACKGROUND OF THE INVENTION

1. Field of the Invention

The present invention generally relates to line module protection methods and devices utilizing those methods, and, more particularly, to a method of protecting a line module in a line accommodating unit of each of the devices that constitute a network system, and an device utilizing that method.

2. Description of the Related Art

A network system shown in FIG. 1 comprises a switching device 10, a transmitting device 11, and terminal devices 12 and 13. Each of these devices is provided with line accommodating units 10a, 11a, 12a, and 13a.

FIG. 2 shows the structure of each line accommodating unit. Normally, a pair of lines are used for communication between devices, and a line accommodating unit 14 comprises N of line accommodating modules $16_1$ to $16_N$ for accommodating L pairs of lines. The line accommodating modules $16_1$ to $16_N$ serve as an interface between a device 18 (or a "common unit" in relation to the line accommodating modules) and the lines. The line accommodating modules $16_1$ to $16_N$ is detachable from the line accommodating unit 14, so that the number of lines can be changed.

Where one of the line accommodating modules $16_1$ to $16_N$ breaks down, line module protection is performed to prevent the connection between the common unit and the accommodated lines from being cut off. As shown in FIG. 3A, the line accommodating unit 14 includes an auxiliary module $16_{N+1}$ as well as the line accommodating modules $16_1$ to $16_N$ (hereinafter referred to as "operating modules"). The auxiliary module $16_{N+1}$ does not normally operate. However, when a failure occurs in one of the operating modules, the auxiliary module $16_{N+1}$ starts operating. For instance, if the operating module $16_2$ breaks down, the auxiliary module $16_{N+1}$ replaces the operating module $16_2$ to perform the line module protection, as shown in FIG. 3B. In FIGS. 3A and 3B, the number L of pairs of lines in each module is 1.

FIG. 4 shows the structure of the conventional line module protection. To perform the line module protection, a protection unit 20 is disposed between the line accommodating unit 14 and the lines. Furthermore, a switching unit 22 and a CPU 24 are disposed in the common unit 18.

The protection unit 20 is a functional block that is added to perform the line module protection. To switch lines, switches 30 disposed on the lines are controlled. Where one line is constituted by a Tip signal and a Ring signal, two switches 30 are necessary for one line, and four switches 30 for one input line and one output line are used to switch the connection between the lines and a line accommodating module.

FIG. 5 illustrates the line module protection where the operating module $16_2$ breaks down. The CPU 24 is notified of the breakdown of the operating module $16_2$ through a module breakdown information line F2. Based on this notification, the CPU 24 instructs the switching unit 22 to switch lines #2 from the operation module $16_2$ to the auxiliary module $16_{N+1}$. The CPU 24 also switches a switch control signal C2 for a corresponding one of the switches 30 from the low level to the high level so as to switch the lines. As shown in FIG. 4B, when a switch control signal is low, a switch 30 connects a terminal C to a terminal A, and when the switch control signal is high, the switch 30 connects the terminal C to a terminal B.

A user is notified of the breakdown through a display 26, and is urged to exchange the operating module $16_2$ for a new one. If the auxiliary module $16_{N+1}$ breaks down, the user is notified of the breakdown through the display 26, and is urged to exchange the auxiliary module $16_{N+1}$ for a new one, without switching the lines.

Generally, the failure rate of the switches 30 is much lower than the failure rate of the line accommodating modules. Therefore, the line module protection is performed so as to lower the failure rate of the entire line accommodating unit 14. By doing so, the failure time is also shortened.

However, in the above conventional method, the auxiliary module is located at an end in the series arrangement of the operating modules, because the auxiliary module is typically provided as a secondary addition to the primary operating modules. If an operation module breaks down more than a predetermined distance away from the auxiliary module, lines disposed between the auxiliary module and the broken operating module (this line will be hereinafter referred to as "protection signal line") may be too long to ensure proper transmission characteristics, thereby hindering proper line module protection. As a result, with the above method, a single auxiliary module cannot provide sufficient protection for as many operating modules as may be desired. Furthermore, even through some of the operating modules do not require line module protection, the protection unit is mounted as one block, resulting in an increase of the hardware costs.

SUMMARY OF THE INVENTION

A general object of the present invention is to provide line module protection methods and devices in which the above disadvantages are eliminated.

A more specific object of the present invention is to provide a line module protection method and a device utilizing that method, by which the number N of line accommodating modules for line module protection can be made greater with respect to one auxiliary module, and the hardware can be flexibly reduced in accordance with the number N of line accommodating modules.

The above objects of the present invention 5 are achieved by a line module protection method for protecting a plurality of line accommodating modules included in a line accommodating unit connected to lines that constitute a network.

This method comprises the steps of:

dividing the plurality of line accommodating modules into a plurality of groups;

switching a connection from a broken one of the plurality of line accommodating modules to an auxiliary module; and locating the auxiliary module substantially at the same distance from all the plurality of groups.

In the above device of the present invention, the plurality of line accommodating modules are divided into the plurality of groups, and the auxiliary module is located substantially at the same distance from all the groups. Thus, the number N of line accommodating modules for line module protection can be made greater with one auxiliary module.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
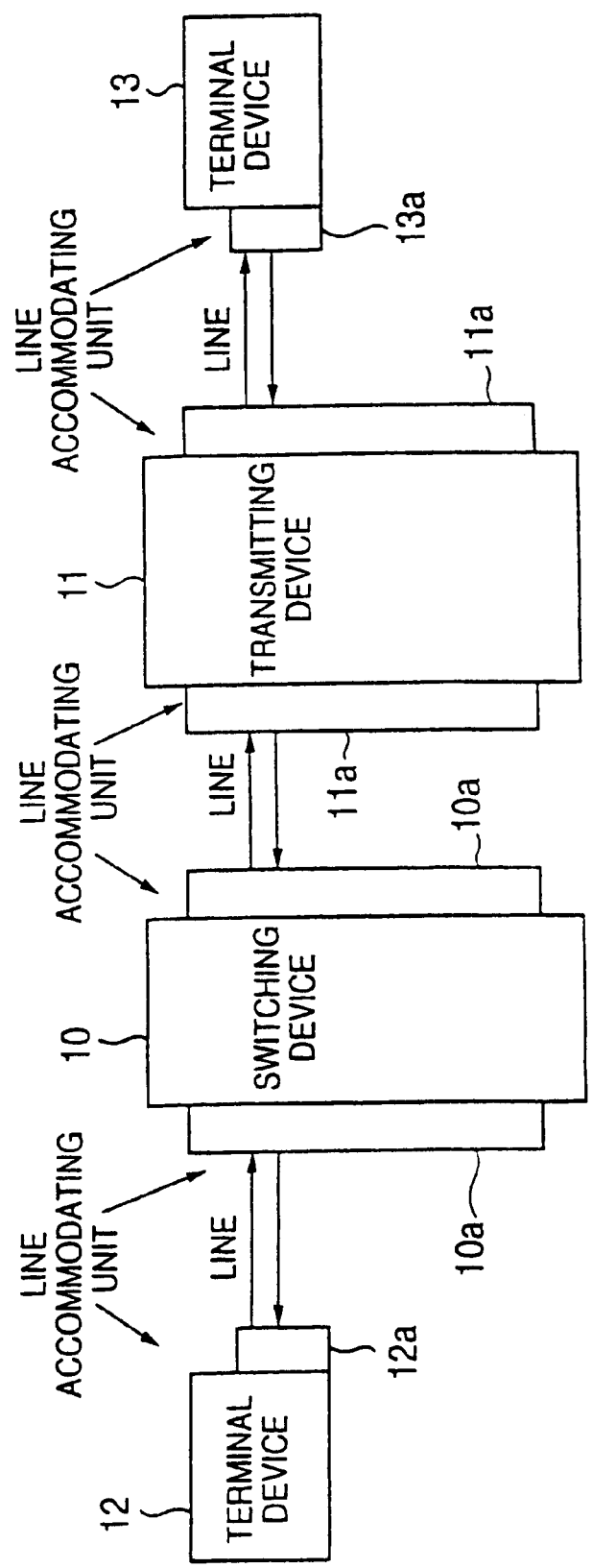
FIG. 1 shows the structure of a network system of the prior art.
Figure 2:
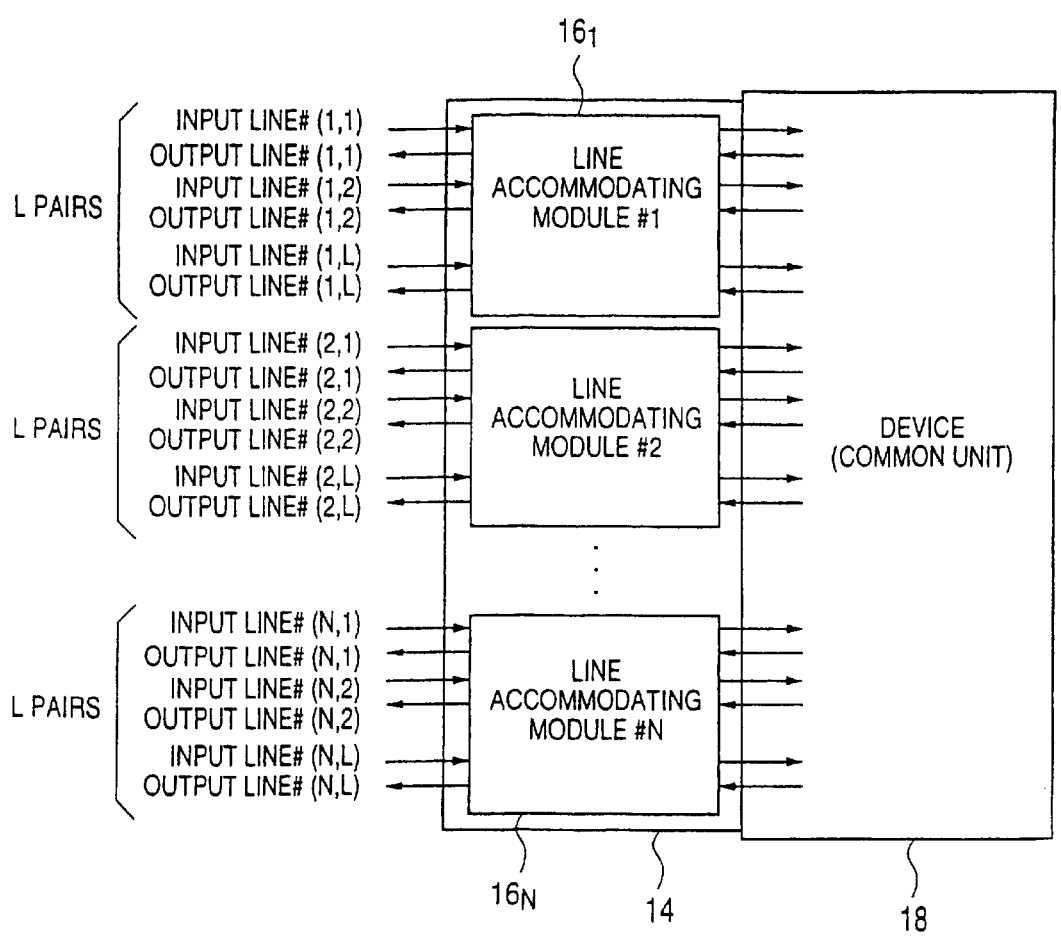
FIG. 2 shows the structure of a conventional line accommodating unit in a network.
Figure 3A:
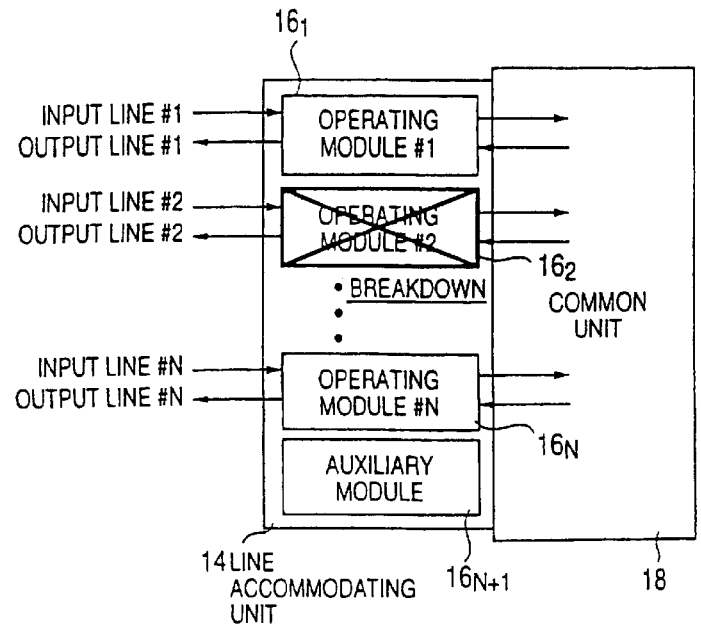
FIGS. 3A and 3B illustrate conventional line module protection in a network.
Figure 3B:
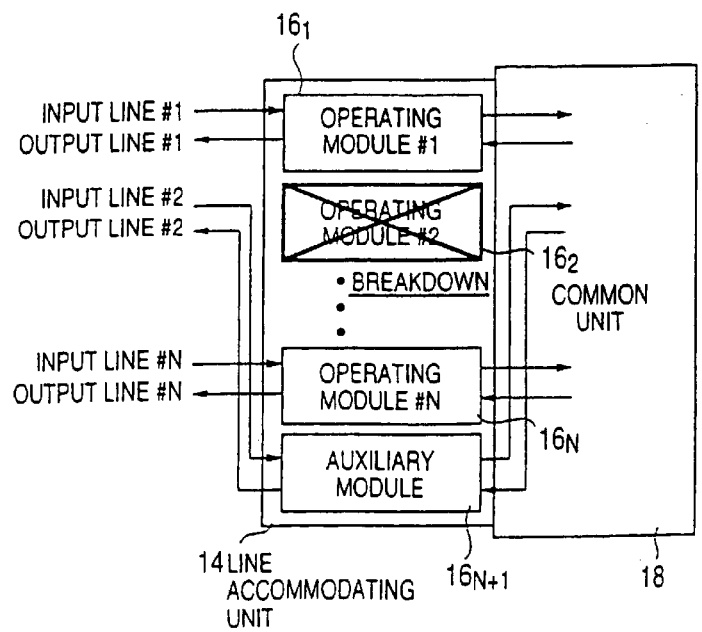
Figure 4A:
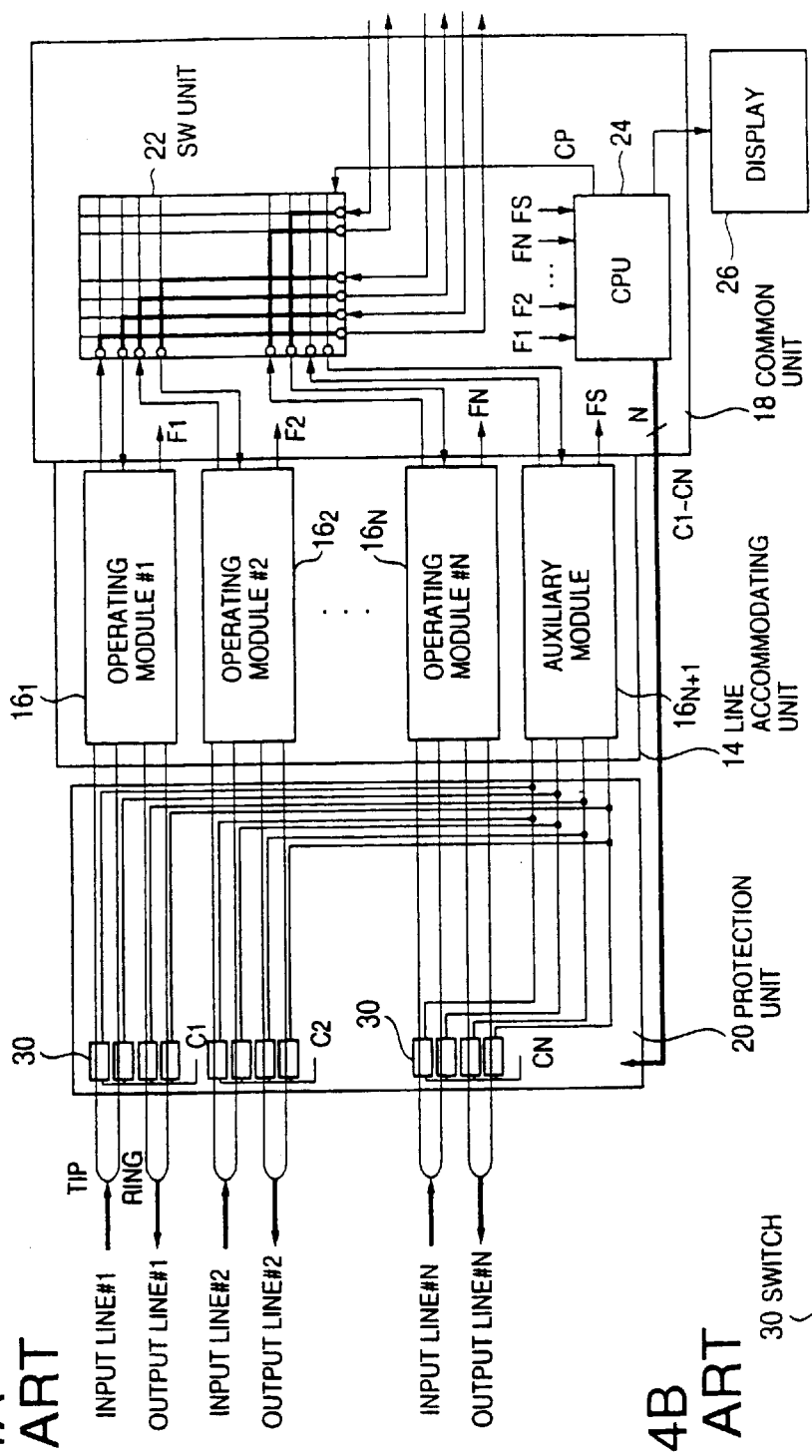
FIGS. 4A and 4B illustrate a conventional protection unit in a network.
Figure 4B:
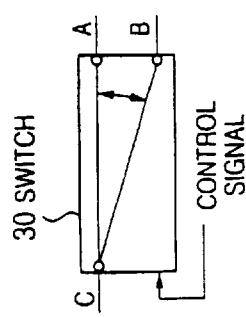
Figure 5:
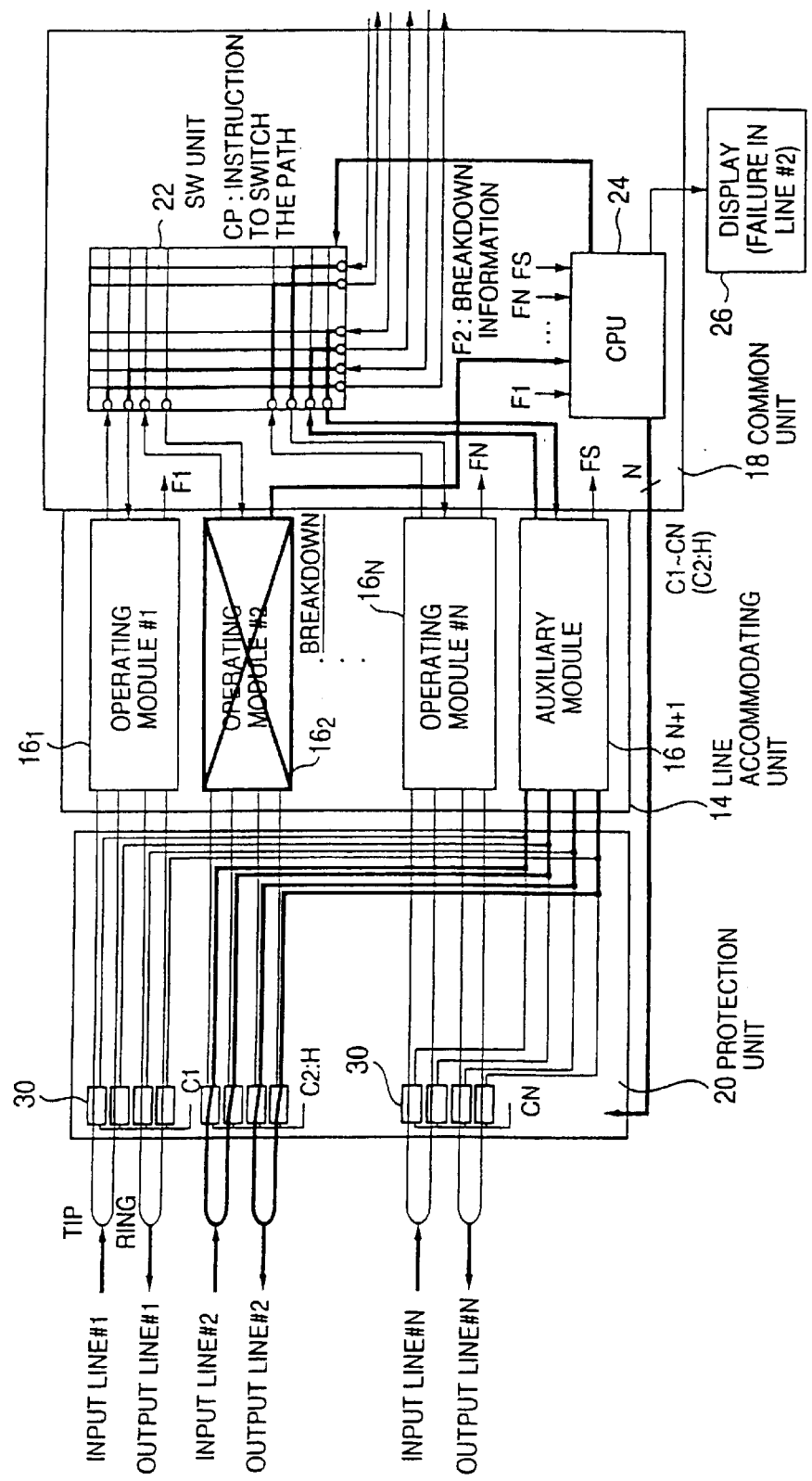
FIG. 5 illustrates conventional line module protection in a network.
Figure 6:
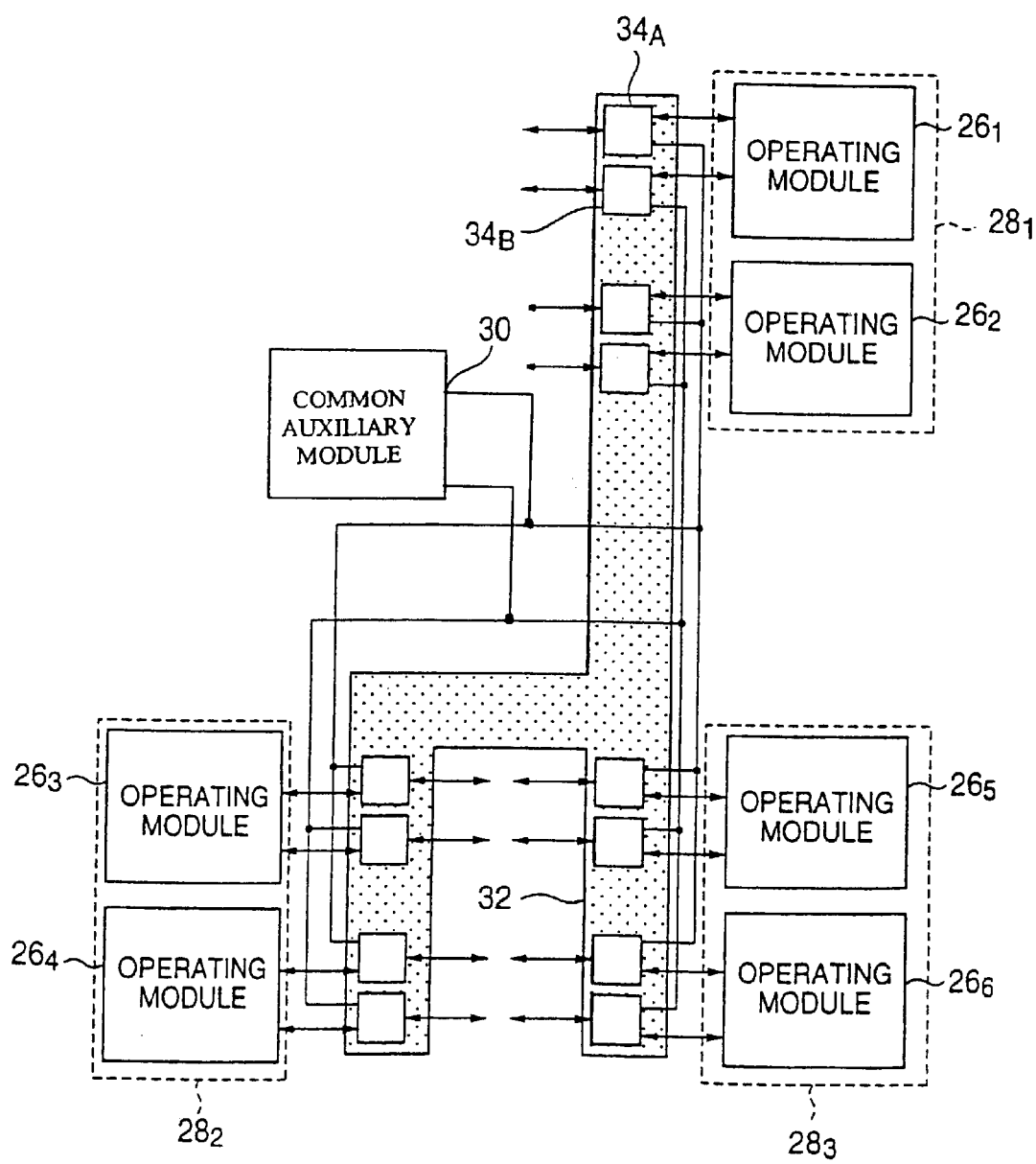
FIG. 6 is a block diagram of a first embodiment of a device to which a line module protection method of the present invention is applied.

In FIG. 6, a plurality of operating modules $26_1$ to $26_6$ are divided into a plurality of groups $28_1$ to $28_3$, and an auxiliary module 30 is placed substantially in the middle of the groups $28_1$ to $28_3$. A protection unit 32 is provided with switches 34A and 34B for each of the operation modules $26_1$ to $26_6$. In this embodiment, the number N of operating modules is 6, the number G of groups of operating modules is 3, and the number L of lines accommodated by each operating module is 2.

Figure 7:
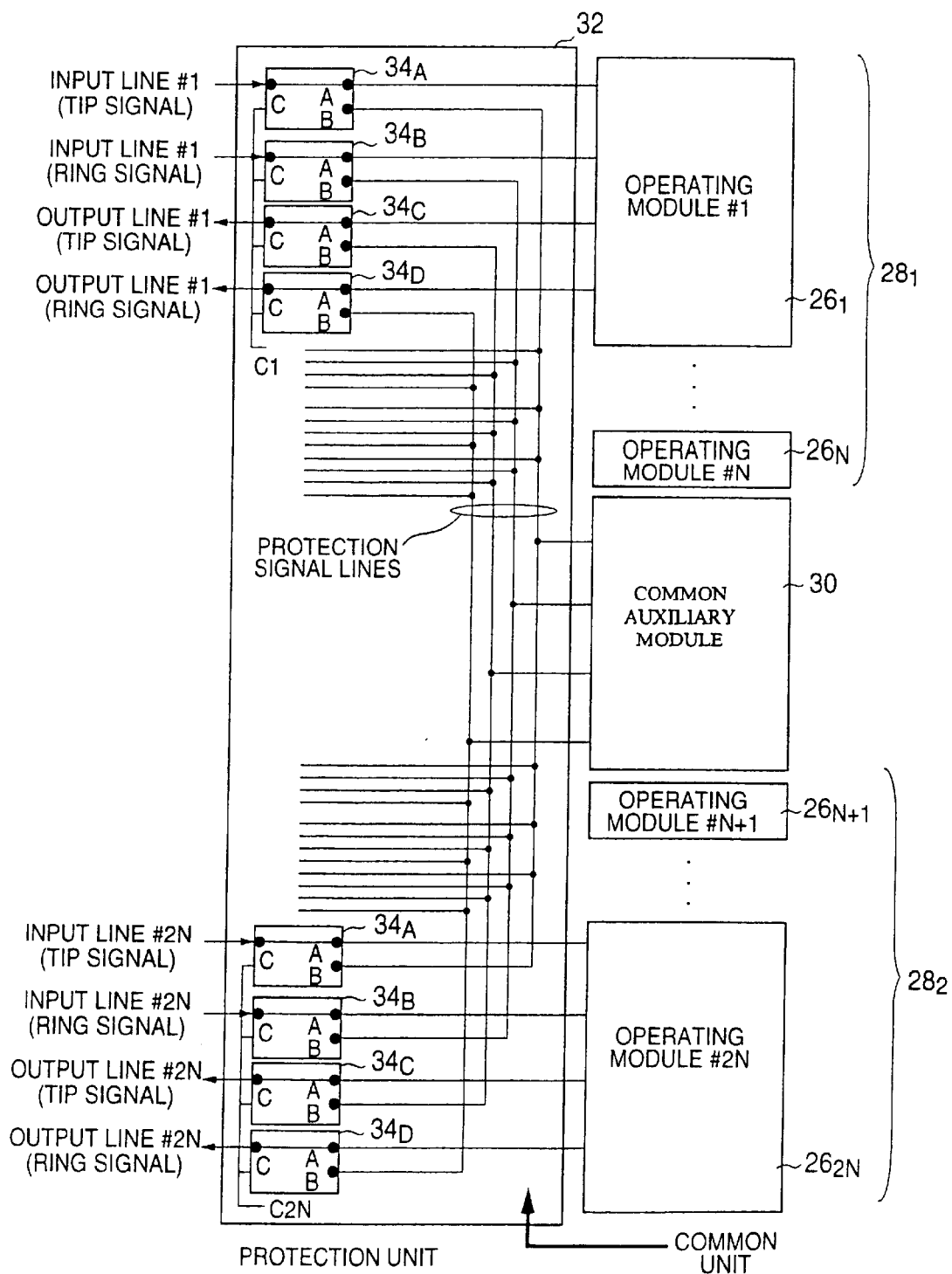
FIG. 7 illustrates the structure of the first embodiment of the device to which the line module protection method of the present invention is applied.

FIG. 7 shows the structure of the first embodiment of the device to which the line module protection method of the present invention is applied. In FIG. 7, 2N operating modules $26_1$ to $26_{2N}$ are divided into two groups $28_1$ and $28_2$ each having N operating modules. The auxiliary module 30 is placed substantially at a midpoint between the two groups $28_1$ and $28_2$, and the auxiliary module 30 and the operating modules $26_1$ to $26_{2N}$ are aligned.

The protection unit 32 is provided with switches $34_A$, $34_B$, $34_C$, and $34_D$ for each of the operating modules $26_1$ to $26_{2N}$. Where one line is constituted by a Tip signal and a Ring signal, two switches are necessary for one line. Therefore, four switches $34_A$, $34_B$, $34_C$, and $34_D$ are required for one input line and one output line to switch the connection between the line accommodating module and the lines. The terminal C of each switch is connected to a line, the terminal A is connected to each corresponding operating module, and the terminal B is connected to the auxiliary module 30 via a protection signal line. When switch control signals C1 to C2N are low, each of the switches $34_A$, $34_B$, $34_C$, and $34_D$ connects the terminal C to the terminal A. When the switch control signals C1 to C2N are high, each of the switches $34_A$, $34_B$, $34_C$, and $34_D$ connects the terminal C to the terminal B.

If the longest distance between the auxiliary module and the operating modules $26_1$ to $26_{2N}$ that warrants proper protection is the same as in the prior art, the number of operating modules that can be protected by one auxiliary module 30 is increased in the configuration described above.

Figure 8:
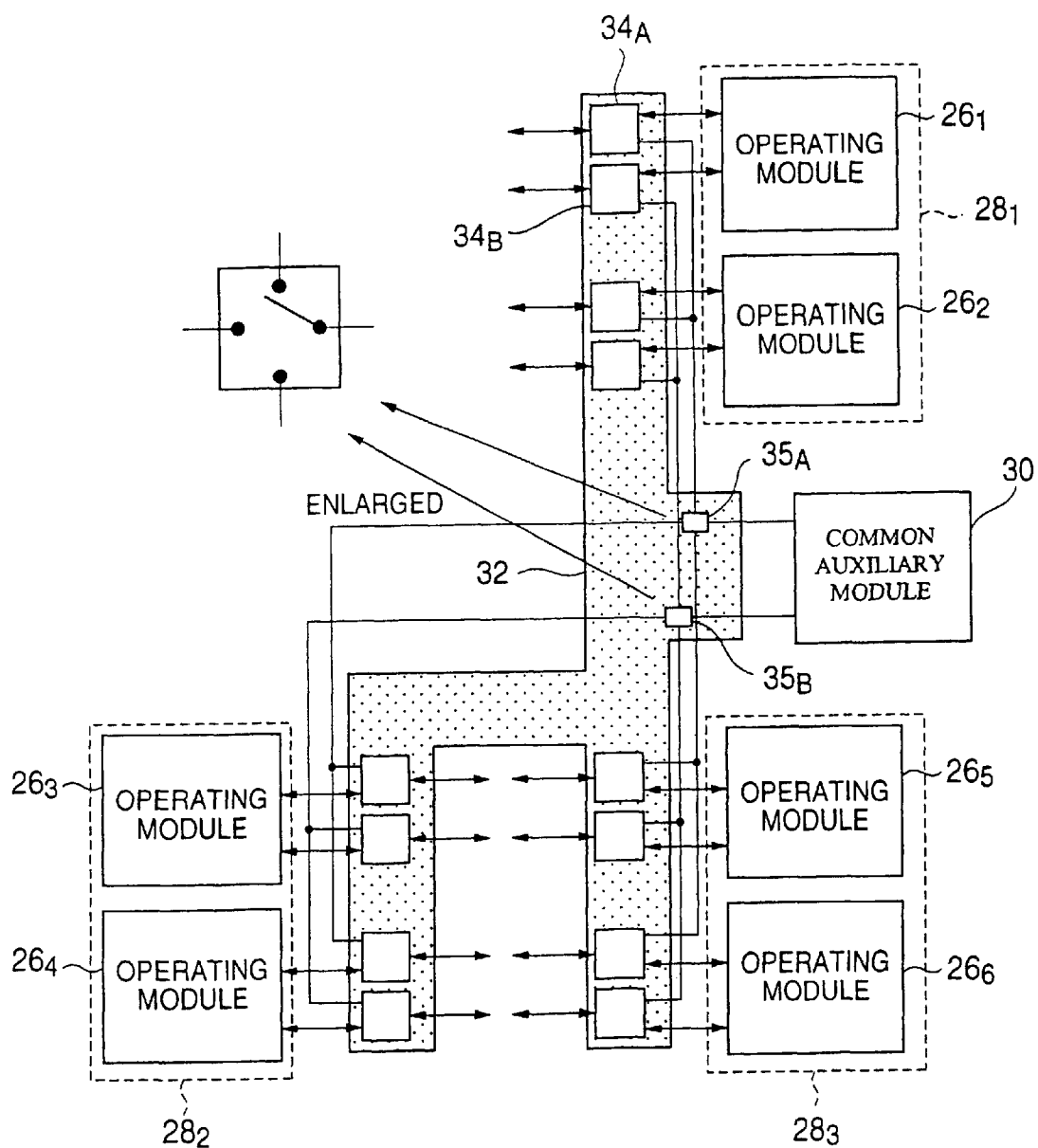
FIG. 8 is a block diagram of a second embodiment of the device to which the line module protection method of the present invention is applied.

FIG. 8 is a block diagram of a second embodiment of the device to which the line module protection method of the present invention is applied. In FIG. 8, a plurality of operating modules $26_1$ to $26_6$ are divided into three groups $28_1$ to $28_3$, and the auxiliary module 30 is placed substantially in the middle of the operating modules $26_1$ to $26_6$. The protection unit 32 is provided with switches $34_A$, and $34_B$ for each of the operation modules $26_1$ to $26_6$. Furthermore, switches $35_A$ and $35_B$ are disposed in the middle of the protection signal lines, thereby dividing the protection signal lines so that a signal line to be connected to the auxiliary module 30 can be selected. In this example, the number N of operating modules is 6, the number G of groups of operating modules is 3, and the number L of lines accommodated by each operating module is 2.

Figure 9:
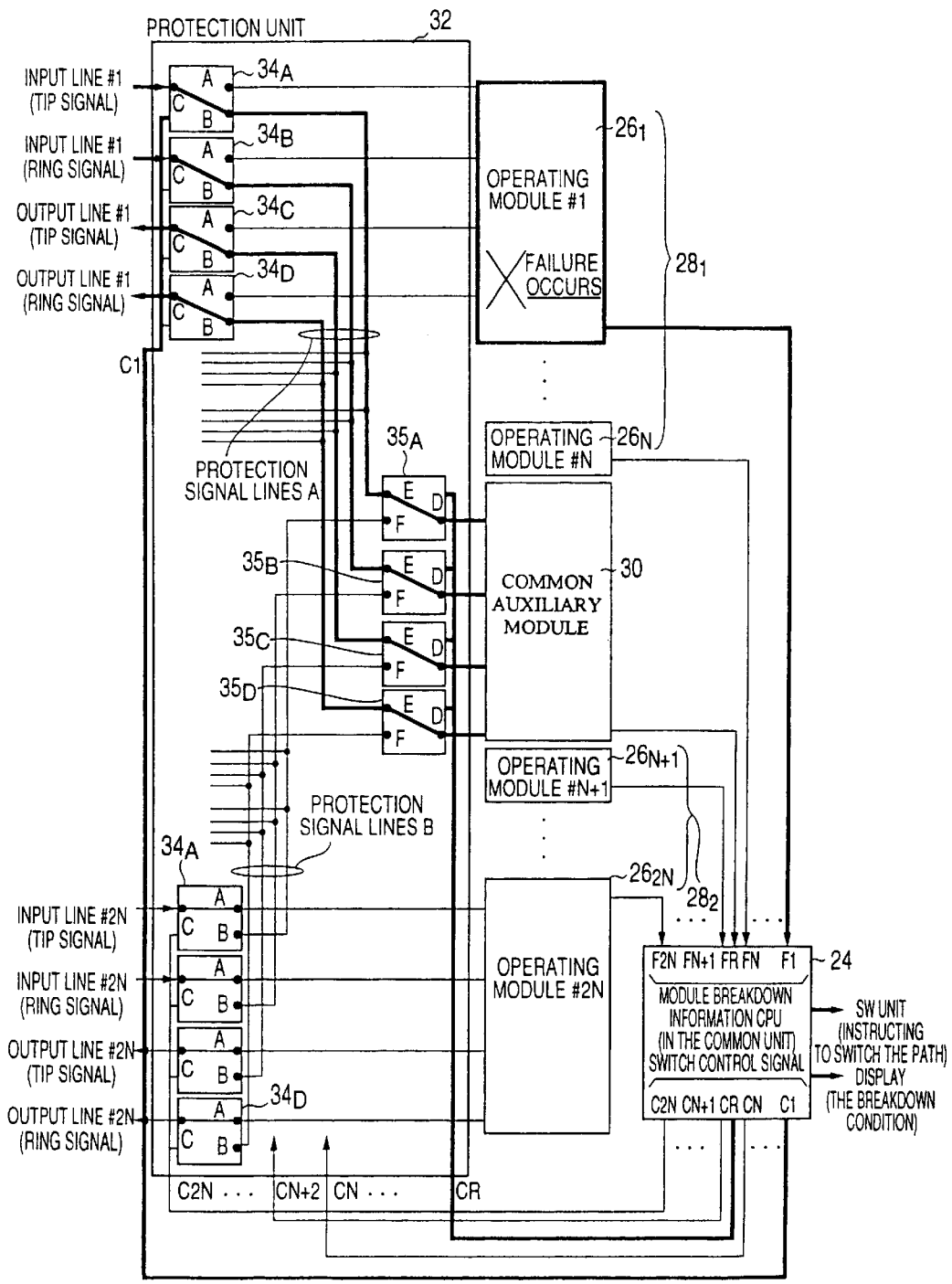
FIG. 9 illustrates the structure of the second embodiment of the device to which the line module protection method of the present invention is applied.

FIG. 9 illustrates the structure of the second embodiment of the device to which the line module protection method of the present invention is applied. In FIG. 9, 2N of operation modules $26_1$ to $26_{2N}$ are divided into two groups $28_1$ and $28_2$ each having N of operating modules. The auxiliary module 30 is placed substantially in the middle of the operating modules $26_1$ to $26_{2N}$, so that the auxiliary module 30 and the operating modules $26_1$ to $26_{2N}$ are aligned.

The protection unit 32 is provided with switches $34_A$, $34_B$, $34_C$, and $34_D$ for each of the operating modules $26_1$ to $26_{2N}$. Where one line is constituted by a Tip signal and a Ring signal, two switches are necessary for one line. Therefore, four switches $34_A$, $34_B$, $34_C$, and $34_D$ are required for one input line and one output line, so as to switch the connection between the line accommodating module and the lines. The terminal C of each switch is connected to a line, the terminal A is connected to each corresponding operating module, and the terminal B is connected to each corresponding one of switches $35_A$, $35_B$, $35_C$, and $35_D$ via the protection signal lines. When the switch control signals C1 to C2N are low, each of the switches $34_A$, $34_B$, $34_C$, and $34_D$ connects the terminal C to the terminal A. When the switch control signals C1 to C2N are high, each of the switches $34_A$, $34_B$, $34_C$, and $34_D$ connects the terminal C to the terminal B.

The terminal D of each of the switches $35_A$, $35_B$, $35_C$, and $35_D$ is connected to the auxiliary module 30, the terminal E is connected to the terminal B of each corresponding one of the switches $34_A$, $34_B$, $34_C$, and $34_D$ of the group $28_1$, and the terminal F is connected to the terminal B of each corresponding one of the switches $34_A$, $34_B$, $34_C$, and $34_D$ of the group $28_2$. When a switch control signal CR is low, each terminal F is connected to each corresponding terminal D. When the switch control signal CR is high, each terminal E is connected to each corresponding terminal D. With the switches $35_A$, $35_B$, $35_C$, and $35_D$ being placed in the middle of the protection signal lines, the length of the protection signal lines can be halved, and branching is eliminated from the protection signal lines. Thus, signal reflection due to branching can be reduced.

As shown in FIG. 9, where the operating module $26_1$ breaks down, the CPU 24 in the common unit 18 (not shown) is notified of the breakdown of the operating module $26_1$ via a signal line F1. The display 26 (not shown) then displays the condition of the breakdown, and the CPU 24 instructs the switching unit 22 to switch the connection from the operating module $26_1$ to the auxiliary module 30. The CPU 24 further instructs the protection unit 32 to switch the lines. Accordingly, the switch control signal C1 is changed to the high level, and the switch control signal CR is also changed to the high level, because the broken module number "1" is smaller than N. Thus, the auxiliary module 30 is connected to the switches $34_A$, $34_B$, $34_C$, and $34_D$ for the operating module $26_1$ through protection signal lines A.

Figure 10:
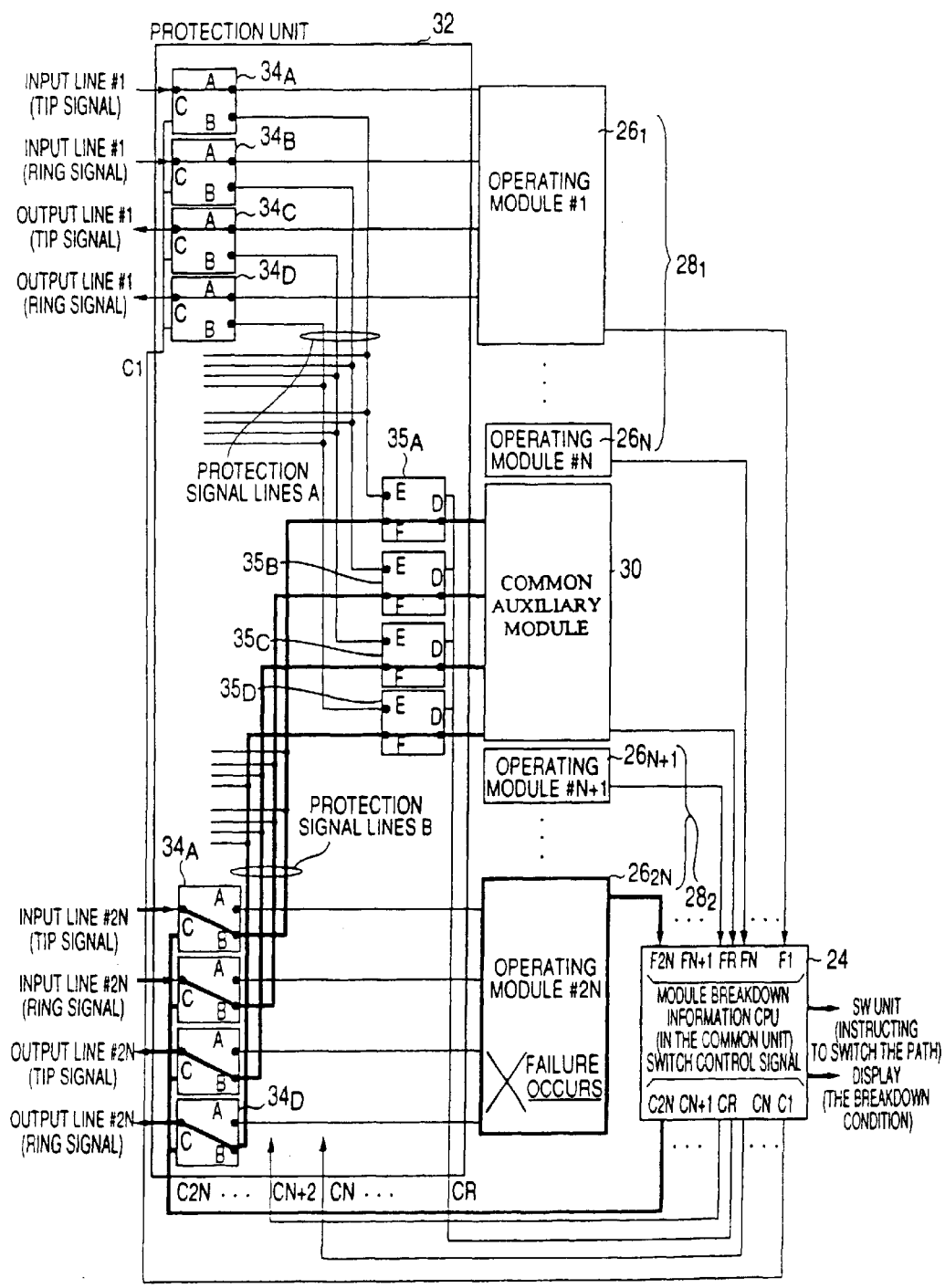
FIG. 10 illustrates the structure of the second embodiment of the device to which the line module protection method of the present invention is applied.

FIG. 10 shows a case where a failure occurs in the operating module $26_{2N}$. In this case, the CPU 24 in the common unit 18 (not shown) is notified of the breakdown of the operation module $26_{2N}$ via a signal line F2. The CPU 24 displays the condition of the breakdown on the display 26 (not shown), and instructs the switching unit 22 to switch the connection from the operating module $26_{2N}$ to the auxiliary module 30. The CPU 24 further instructs the protection unit 32 to switch the lines. Accordingly, the switch control signal C2N is changed to the high level, while the switch control signal CR is changed to the low level, because the broken module number "2N" is greater than N. Thus, the auxiliary module 30 is connected to the switches $34_A$, $34_B$, $34_C$, and $34_D$ for the operating module $26_{2N}$ by protection signal lines B.

Figure 11:
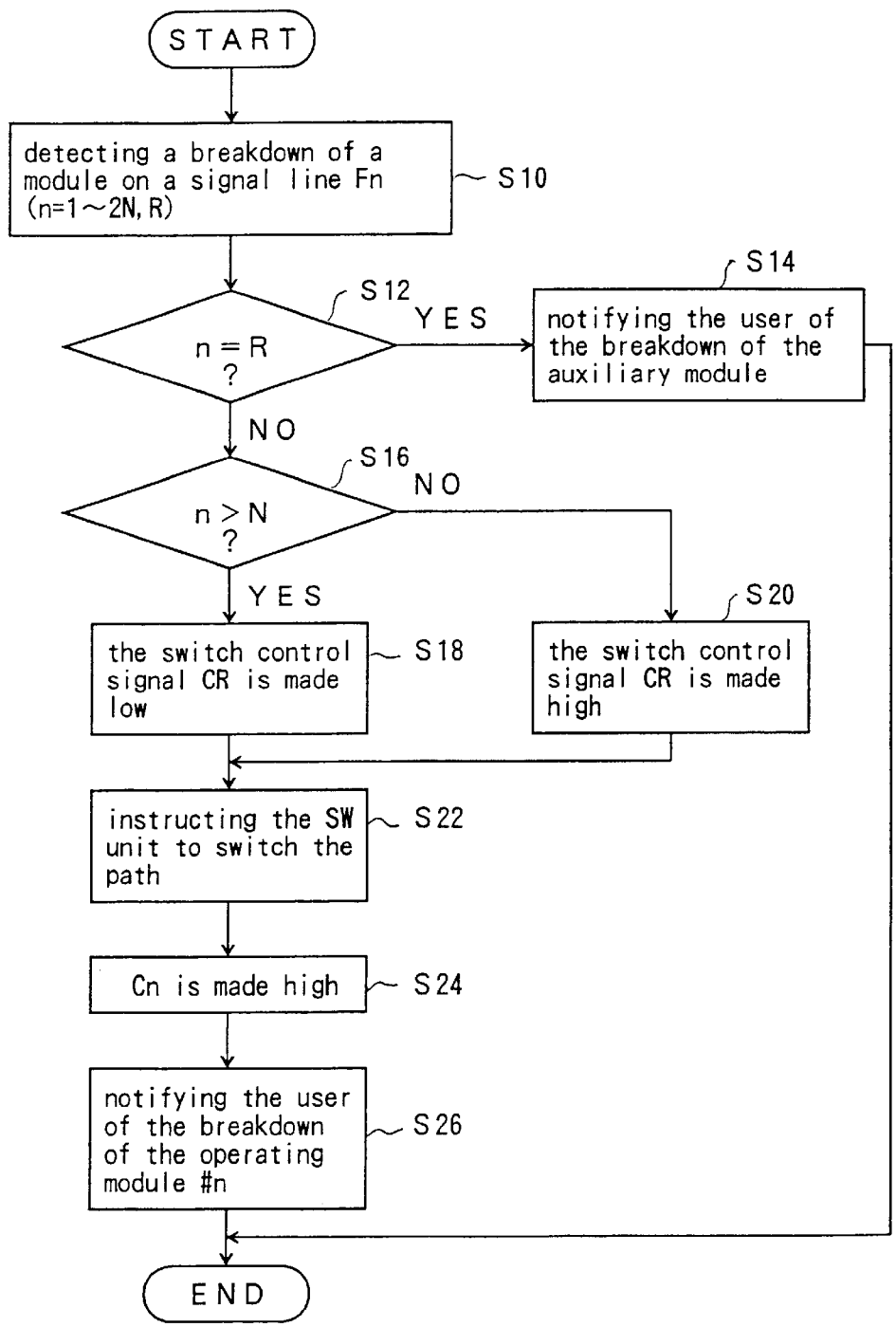
FIG. 11 is a flowchart of a control operation performed by the CPU in the second embodiment.

FIG. 11 is a flowchart of the control operation performed by the CPU 24. In step S10, the CPU 24 detects a breakdown of an operating module through the signal lines F1 to F2N. In step S12, it is determined whether or not the broken module number "n" is R. If the broken module number "n" is R, the user is notified of the breakdown of the auxiliary module in step S14.

If the broken module's number "n" is not R, on the other hand, it is determined whether or not the broken module's number "n" is greater than N, which is half the total number "2N" of operating modules. If the broken module's number "n" is greater than N, the switch control signal CR is changed to the low level in step S18. If the broken module's number "n" is not greater than N, the switch control signal CR is changed to the high level in step S20.

In step S22, the CPU 24 instructs the switching unit 22 to switch the connection from the lines of the broken operating module to the lines of the auxiliary module. In step S24, the switch control signal Cn (n=the broken operating module's number) is changed to the high level. In step S26, the CPU 24 notifies the user of the breakdown of the operating module n, and the operation comes to an end.

Figure 12:
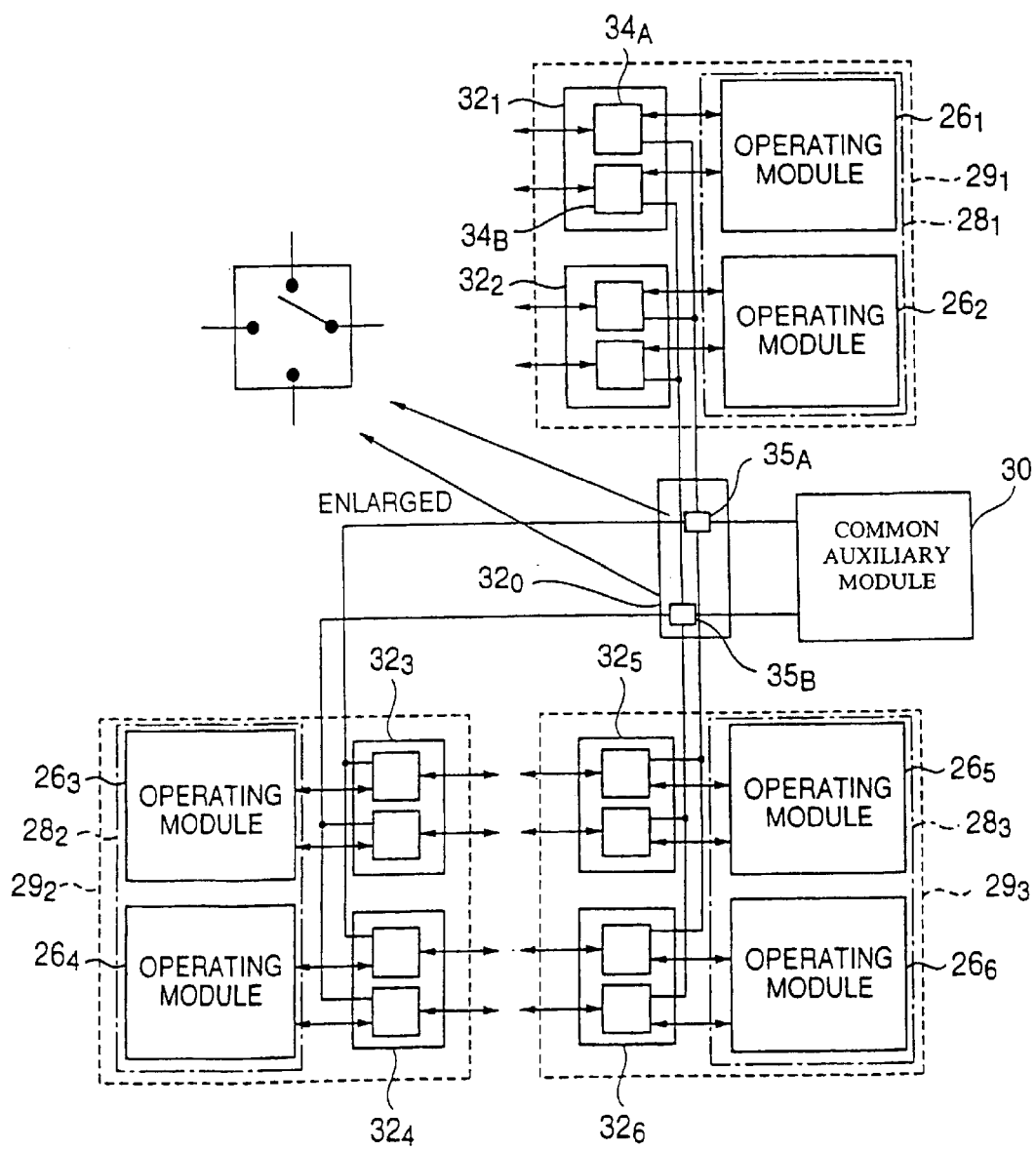
FIG. 12 is a block diagram of a third embodiment of the device to which the line module protection method of the present invention is applied.

FIG. 12 is a block diagram of a third embodiment of the device to which the line module protection method of the present invention is applied. In FIG. 12, a plurality of operating modules $26_1$ to $26_6$ are divided into a plurality of groups $28_1$ to $28_3$, and the auxiliary module 30 is placed substantially in the middle of the operating modules $26_1$ to $26_6$. The protection unit 32 is also divided into divisional protection units $32_1$ to $32_6$. Each of the divisional protection units $32_1$ to $32_6$ is provided with switches $34_A$, and $34_B$. The operation modules $26_1$ to $26_6$ and the divisional protection units $32_1$ to $32_6$ constitute line accommodating modules $29_1$ to $29_3$. A protection unit $32_0$ is placed in the middle of the protection signal lines, thereby dividing the protection signal lines so that a protection signal line to be connected to the auxiliary module 30 can be selected. In this example, the number N of operation modules 6, the number G of groups of operating modules is 3, and the number L of lines accommodated in each operating module is 2.

Where the protection unit 32 constitutes one block, the line module protection is performed by all the lines, or the line module protection is not performed at all. However, there is a demand for line module protection partially using the line accommodating units. In response to this demand, if there are operating modules which do not require line module protection, the divisional protection units of those operating modules can be omitted in this embodiment. Thus, more freedom is allowed in designing. If the operating module $26_6$ does not require line module protection, for instance, it is not necessary to employ the divisional protection unit $32_6$.

Figure 13:
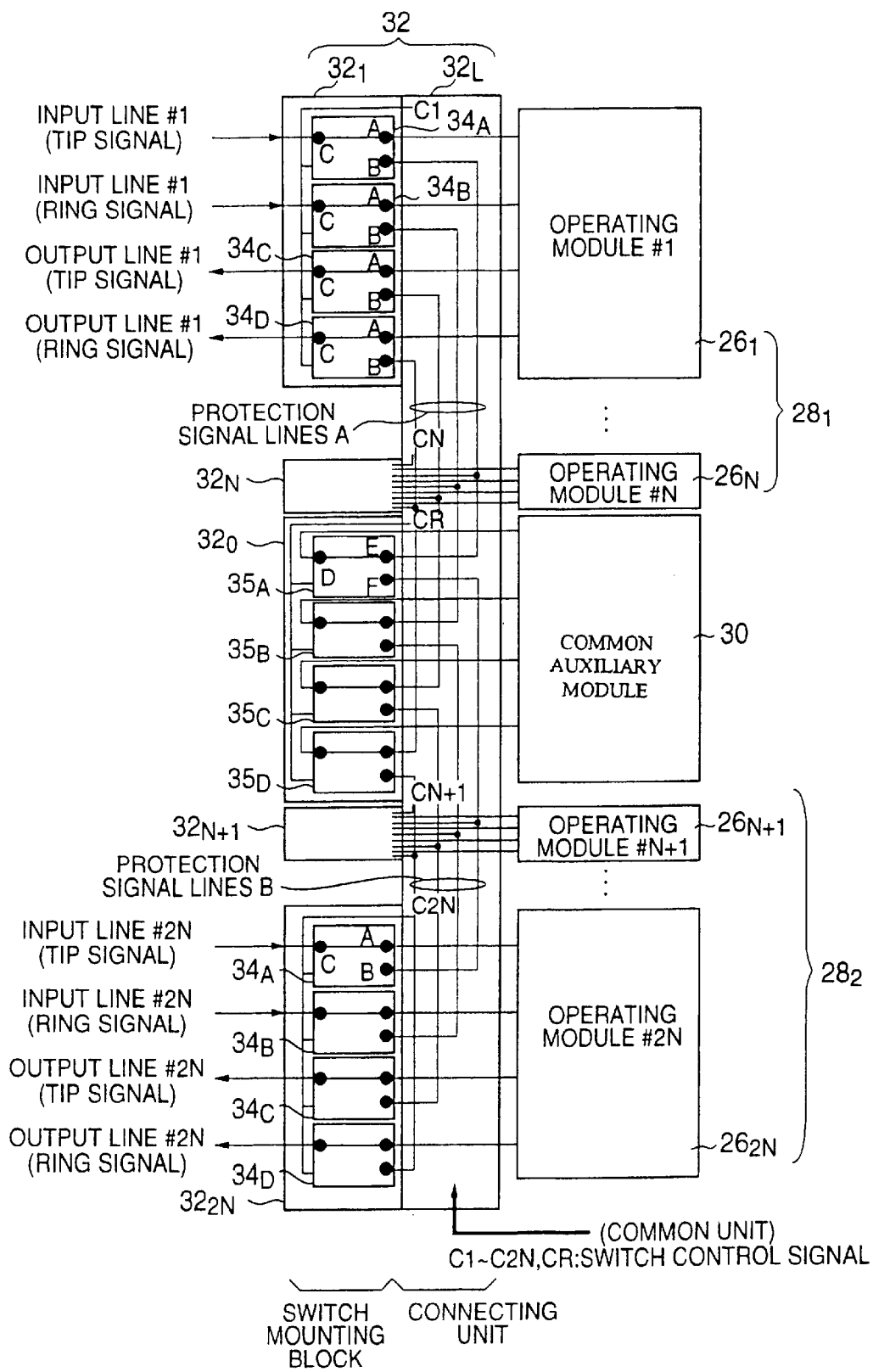
FIG. 13 illustrates the structure of the third embodiment of the device to which the line module protection method of the present invention is applied.

FIG.13 illustrates the structure of the third embodiment of the device to which the line module protection method of the present invention is applied. In FIG. 13, 2N of operating modules $26_1$ to $26_{2N}$ are divided into two groups $28_1$ and $28_2$ each having N of operating modules, and the auxiliary module 30 is placed substantially in the middle of the operating modules $26_1$ to $26_{2N}$. The auxiliary module 30 and the operating modules $26_1$ to $26_{2N}$ are aligned.

The protection unit 32 includes divisional protection units $32_1$ to $32_{2N}$ for the operating modules $26_1$ to $26_{2N}$, respectively, the divisional protection unit $32_0$ for the auxiliary module 30, and a connecting unit $32_L$ that connects the modules and the protection unit 32. Each of the divisional protection units $32_1$ to $32_{2N}$ is provided with switches $34_A$, $34_B$, $34_C$, and $34_D$. Where one line is constituted by a Tip signal and a Ring signal, two switches are necessary for one line. Therefore, four switches $34_A$, $34_B$, $34_C$, and $34_D$ are required for one input line and one output line so as to switch the connection between the lines and the line accommodating module. The terminal C of each switch is connected to each corresponding line, the terminal A is connected to each corresponding one of the operating modules $26_1$ to $26_{2N}$, and the terminal B is connected to each corresponding one of switches $35_A$, $35_B$, $35_C$, and $35_D$ of the divisional protection unit $32_0$ via the protection signal lines. When the switch control signals C1 to C2N are low, each of the switches $34_A$, $34_B$, $34_C$, and $34_D$ connects the terminal C to the terminal A. When the switch control signals C1 to C2N are high, each of the switches $34_A$, $34_B$, $34_C$, and $34_D$ connects the terminal C to the terminal B.

The terminal D of each of the switches $35_A$, $35_B$, $35_C$, and $35_D$ of the divisional protection unit $32_0$ is connected to the auxiliary module 30, the terminal E is connected to each corresponding one of the switches $34_A$, $34_B$, $34_C$, and $34_D$ of the group $28_1$, and the terminal F is connected to each corresponding one of the switches $34_A$, $34_B$, $34_C$, and $34_D$ of the group $28_2$. When the switch control signal CR is low, each of the switches $35_A$, $35_B$, $35_C$, and $35_D$ connects the terminal F to the terminal D. When the switch control signal CR is high, each of the switches $35_A$, $35_B$, $35_C$, and $35_D$ connects the terminal E to the terminal D.

Figure 14:
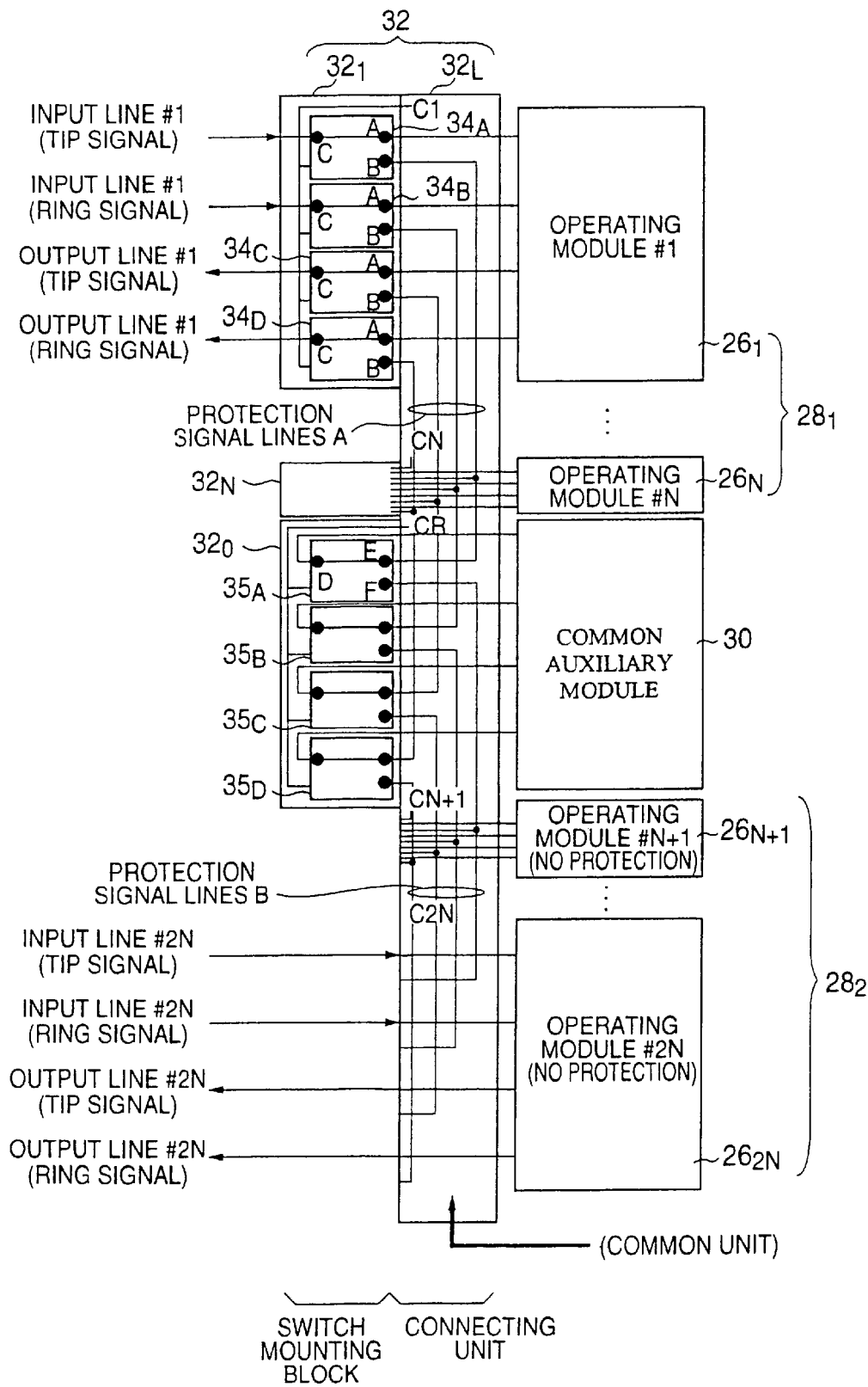
FIG. 14 illustrates the structure of the third embodiment of the device to which the line module protection method of the present invention is applied.
Figure 15:
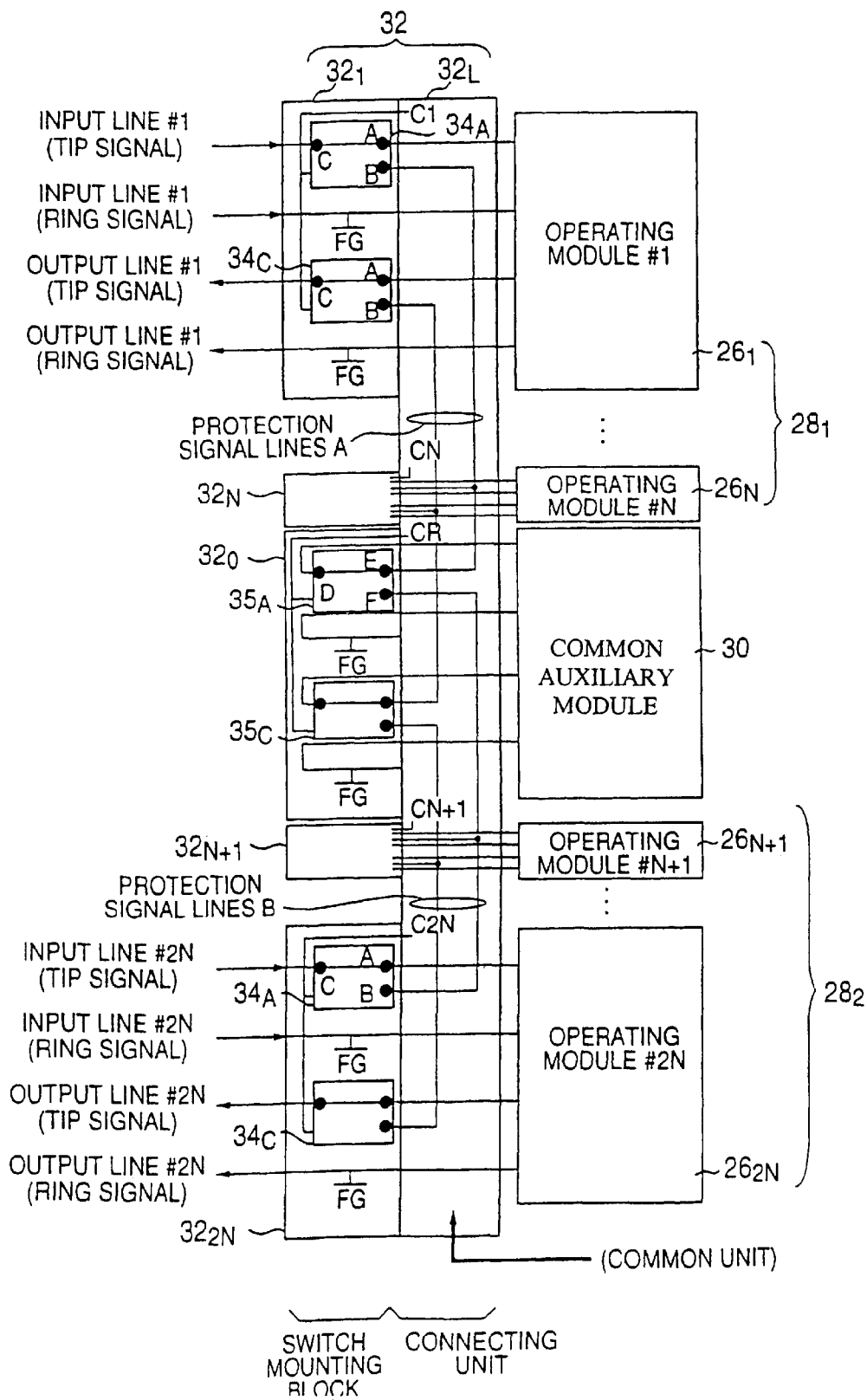
FIG. 15 illustrates the structure of the third embodiment of the device to which the line module protection method of the present invention is applied.

If the operating modules $26_{N+1}$ to $26_{2N}$ do not require line module protection, the divisional protection units $32_{N+1}$ to $32_{2N}$ can be eliminated, as shown in FIG. 14.

If a frame ground (FG) is used in place of the Ring signal on each line, the switches $34_B$ and $34_D$ of the divisional protection units $32_1$ to $32_{2N}$, and the switches $35_B$ and $35_D$ of the divisional protection unit $32_0$ can be omitted. Thus, the number of switches can be further reduced.

Figure 16:
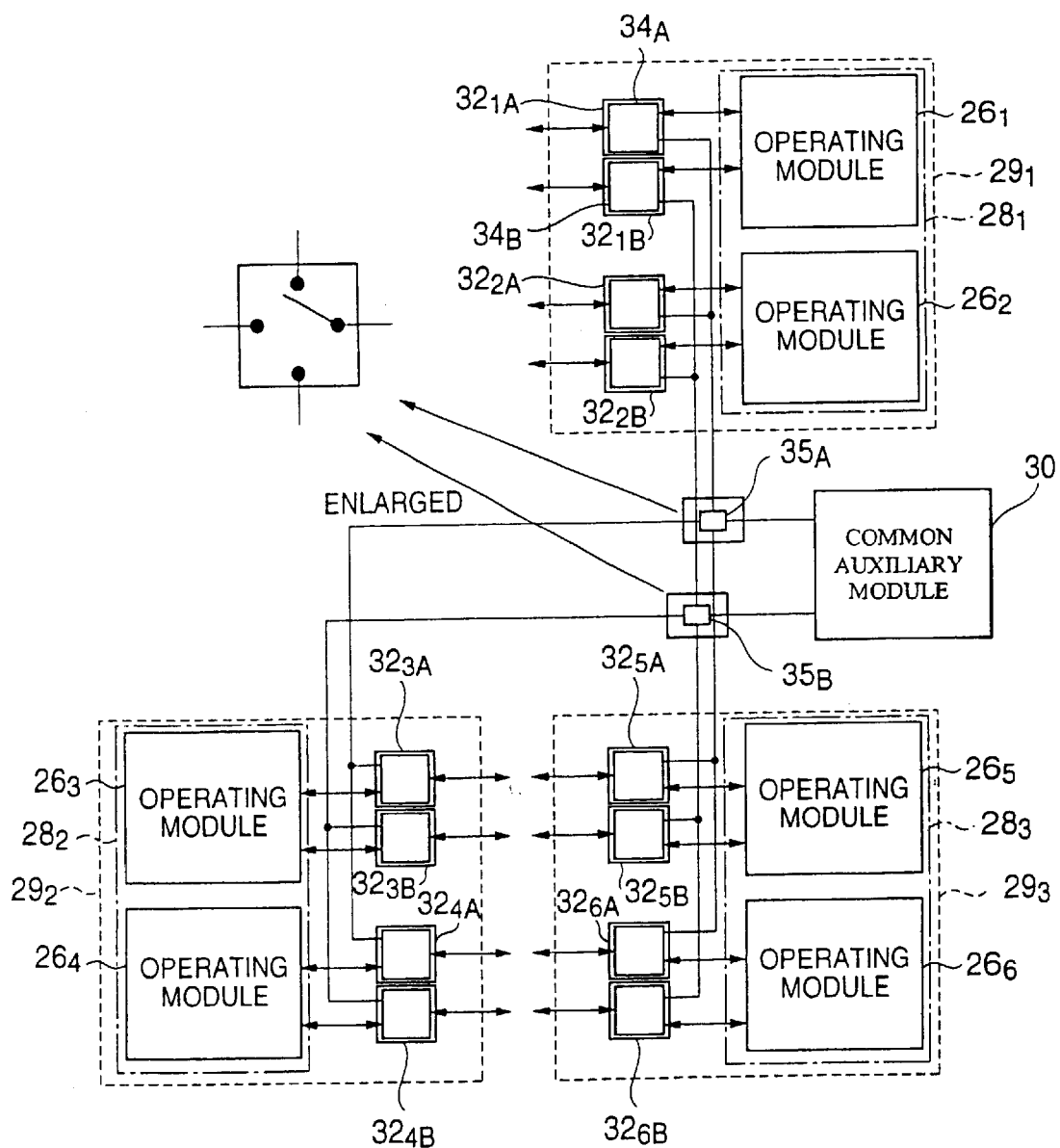
FIG. 16 is a block diagram of a fourth embodiment of the device to which the line module protection method of the present invention is applied.

FIG. 16 is a block diagram of a fourth embodiment of the device to which the line module protection method of the present invention is applied. In FIG. $16_1$ a plurality of operating modules $26_1$ to $26_6$ are divided into a plurality of groups $28_1$ to $28_3$, and the auxiliary module 30 is placed substantially in the middle of the operating modules $26_1$ to $26_6$. The protection unit 32 is also divided into divisional protection units $32_{1A}$ and $32_{1B}$ to $32_{6A}$ and $32_{6B}$. Each of the divisional protection units $32_{1A}$ and $32_{1B}$ to $32_{6A}$ and $32_{6B}$ is provided with a switch $34_A$ or $34_B$. Protection units $32_{0A}$ and $32_{1B}$ are also placed in the middle of the protection signal lines, thereby dividing the protection signal lines so that a protection signal line to be connected to the auxiliary module 30 can be selected. In this example, the number N of operation modules 6, the number G of groups of operating modules is 3, and the number L of lines accommodated in each operating module is 2.

Where the protection unit 32 constitutes one block, the line module protection is performed by all the lines, or the line module protection is not performed at all. However, there is a demand for line module protection partially using the line accommodating units. In response to this demand, if there are operating modules which do not require line module protection, the divisional protection units of those operating modules can be omitted in this embodiment. Thus, more freedom is allowed in designing.

Figure 17:
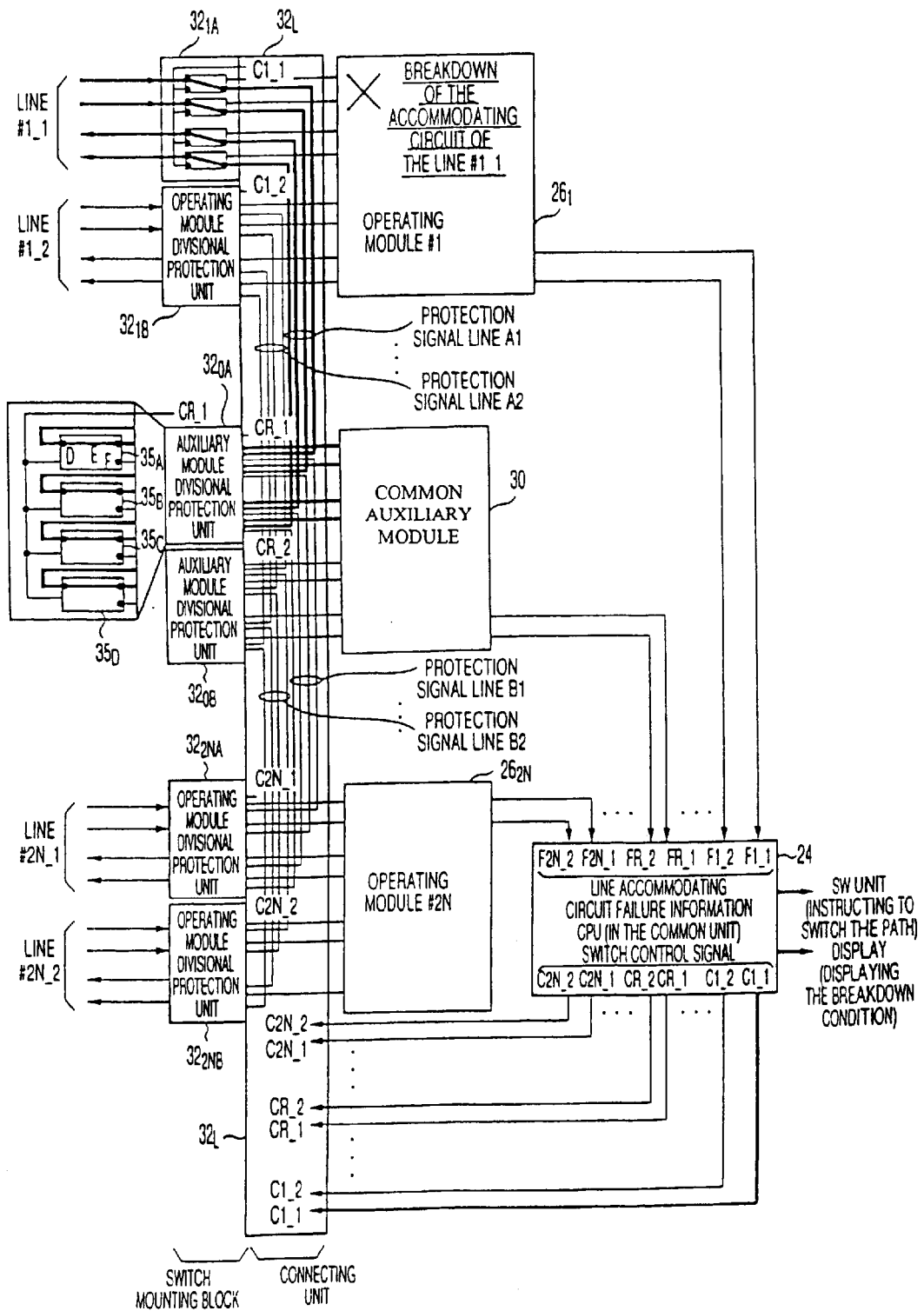
FIG. 17 illustrates the structure of the fourth embodiment of the device to which the line module protection method of the present invention is applied.
Figure 18:
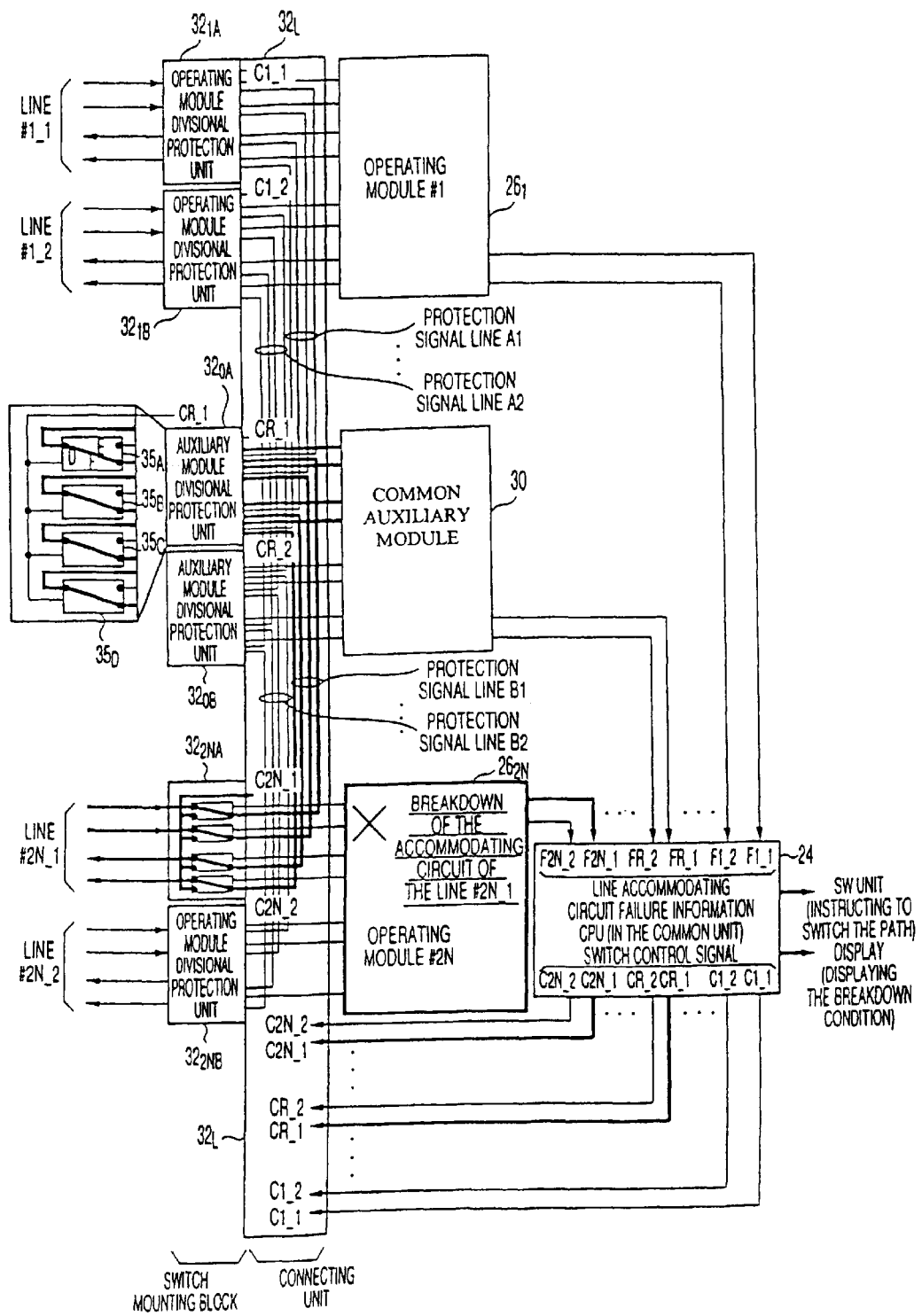
FIG. 18 illustrates the structure of the fourth embodiment of the device to which the line module protection method of the present invention is applied.

FIG. 17 illustrates the structure of the fourth embodiment of the device to which the line module protection method of the present invention is applied. In FIG. 17, 2N of operating modules $26_1$ to $26_{2N}$ are divided into two groups $28_1$ and $28_2$ each having N of operating modules, and the auxiliary module 30 is placed substantially in the middle of the operating modules $26_1$ to $26_{2N}$. The auxiliary module 30 and the operating modules $26_1$ to $26_{2N}$ are aligned.

The protection unit 32 includes divisional protection units $32_{1A}$ and $32_{1B}$ to $32_{2NA}$ to $32_{2NB}$ for the input lines and output lines of the operating modules $26_1$ to $26_{2N}$, respectively, the divisional protection unit $32_{0A}$ and $32_{0B}$ for the auxiliary module 30, and a connecting unit $32_L$ that connects the modules and the protection unit 32. Each of the divisional protection units $32_{1A}$ and $32_{1B}$ to $32_{2NA}$ to $32_{2NB}$ is provided with two switches $34_A$, and $34_B$ or $34_C$ and $34_D$. Where one line is constituted by a Tip signal and a Ring signal, two switches are necessary for one line. Therefore, four switches $34_A$, $34_B$, $34_C$, and $34_D$ are required for one input line and one output line so as to switch the connection between the lines and the line accommodating module. The terminal C of each switch is connected to each corresponding line, the terminal A is connected to each corresponding one of the operating modules $26_1$ to $26_{2N}$, and the terminal B is connected to each corresponding one of switches $35_A$, $35_B$, $35_C$, and $35_D$ of the divisional protection units $32_{0A}$ and $32_{0B}$ via the protection signal lines of the connecting unit $32_L$. When the switch control signals C1 to C2N are low, each of the switches $34_A$, $34_B$, $34_C$, and $34_D$ connects the terminal C to the terminal A. When the switch control signals C1 to C2N are high, each of the switches $34_A$, $34_B$, $34_C$, and $34_D$ connects the terminal C to the terminal B.

The terminal D of each of the switches $35_A$, $35_B$, $35_C$, and $35_D$ of the divisional protection units $32_{0A}$ and $32_{0B}$ is connected to the auxiliary module 30, the terminal E is connected to each corresponding one of the switches $34_A$, $34_B$, $34_C$, and $34_D$ of the group $28_1$, and the terminal F is connected to each corresponding one of the switches $34_A$, $34_B$, $34_C$, and $34_D$ of the group $28_2$. When the switch control signal CR is low, each of the switches $35_A$, $35_B$, $35_C$, and $35_D$ connects the terminal F to the terminal D. When the switch control signal CR is high, each of the switches $35_A$, $35_B$, $35_C$, and $35_D$ connects the terminal E to the terminal D.

In this example, the number of operating modules is 2N, the number of lines accommodated in each operating module is 2, and the line module protection is performed for each line. One divisional protection unit is provided for each line, and control lines are disposed for switch control signals to control the divisional protection units. The CPU 24 in the common unit 18 controls the switch control signals separately from each other.

Where the circuit that accommodates the line #1_1 breaks down in the operating module $26_1$, the CPU 24 in the common unit 18 is notified of the breakdown of the module $26_1$ through the signal line F1_1. The CPU 24 then instructs the display 26 to display the condition of the breakdown, and also instructs the switching unit 22 to switch the connection from the line #1_1 of the operating module $26_1$ to the line of the auxiliary module 30. The CPU 24 further instructs the protection unit $32_{1A}$ to switch the lines, so that the switch control signal Cl_1 is changed to the high level. Since the broken module's number "1" is smaller than N, which is half the number of operation modules, the switch control signal CR is changed to the high level. Accordingly, the line #1_1 is connected to the auxiliary module 30 via protection signal lines Al. Here, a line #1_2 remains accommodated in the operating module #1.

Where the line accommodating circuit of the operating module $26_{2N}$ breaks down, the CPU 24 in the common unit 18 is notified of the breakdown of the module $26_{2N}$. The CPU 24 then instructs the display 26 to display the condition of the breakdown, and also instructs the switching unit 22 to switch the connection from the line #2N_1 of the operating module $26_{2N}$ to the lines of the auxiliary module 30. The CPU 24 further instructs the protection unit $32_{2NA}$ to switch the lines, so that the switch control signal C2N_1 is changed to the high level. Since the broken module's number "2N" is greater than N, which is half the total number of operating modules, the switch control signal CR is changed to the low level. Accordingly, the line #2N_1 is connected to the auxiliary module 30 via protection signal lines B1. Here, a line #2N_2 remains accommodated in the operating module #2N.

Figure 19:
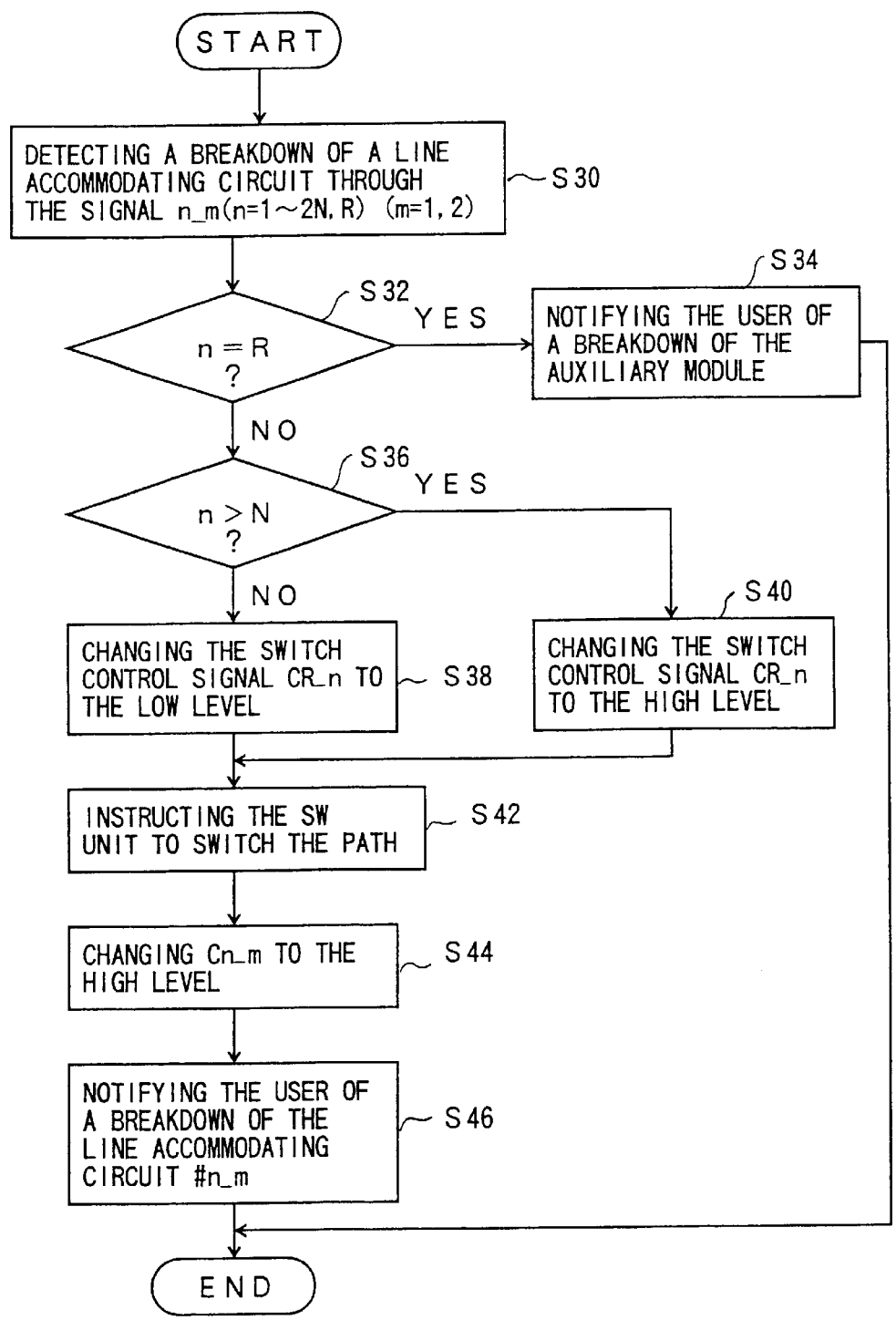
FIG. 19 is a flowchart of a control operation performed by the CPU in the fourth embodiment.

FIG. 19 is a flowchart of a control operation performed by the CPU 24. In step S30, the CPU 24 detects a breakdown of a line accommodating circuit through a signal line Fn_m (n=1 to 2N, m=1 or 2). In step S32, it is determined whether or not the broken circuit's number "n" is R. If the broken circuit's number "n" is R, the user is notified of the breakdown of the auxiliary module 30 in step S34, and the operation comes to an end.

If the broken circuit's number "n" is not R, on the other hand, it is determined whether the broken circuit's number "n" is greater than N, which is half the total number of operating modules. If the broken circuit's number "n" is greater than N, the switch control signal CR is changed to the low level in step S38. If the broken circuit's number "n" is not greater than N, the switch control signal CR is changed to the high level in step S40.

In step S42, the CPU 24 instructs the switching unit 22 to switch the connection from the lines of the broken circuit to the lines of the auxiliary modules 30. In step S44, the switch control signal Cn_m ("n" is the broken circuit's number) is changed to the high level. In step S46, the user is notified of the breakdown of the line accommodating circuit #n_m.

The present invention is not limited to the specifically disclosed embodiments, but variations and modifications may be made without departing from the scope of the present invention.

The present application is based on Japanese priority application No. 11-228875, filed on Aug. 12, 1999, the entire contents of which are hereby incorporated by reference.

What is claimed is:

1. A line module protection method for protecting a plurality of line accommodating modules included in a line accommodating unit connected to lines that constitute a network, said method comprising the steps of:

dividing the plurality of a line accommodating modules into a plurality of groups;

providing a common auxiliary module substantially at the same distance from all the plurality of groups; and switching a connection from a broken one of the plurality of line accommodating modules to the auxiliary module.

2. The method as claimed in claim 1, wherein the switching step includes the step of selecting one of a plurality of protection signal lines connected to the plurality of groups, said plurality of protection signal lines being connected to the common auxiliary module.

3. The method as claimed in claim 1, further comprising the step of detachably providing switches each for a corresponding one of the plurality of line accommodating modules so as to select one of the line accommodating modules and to connect the selected one to the common auxiliary module.

4. The method as claimed in claim 1, further comprising the step of detachably providing switches each for a corresponding one of lines connected to the plurality of line accommodating modules so as to select one of the line accommodating modules and to connect the one to the common auxiliary module.

5. A line module protection device, comprising:

a plurality of line accommodating modules that are divided into a plurality of groups and are contained in a line accommodating unit connected to lines in a network; and a common auxiliary module that is located substantially at the same distance from all the plurality of groups, wherein when there is a broken line accommodating module, a line connection is switched from the broken line accommodating module to the auxiliary module.

6. The line module protection device as claimed in claim 5, further comprising:

first switches each connected to a corresponding one of the line accommodating modules;

second switches connected to the common auxiliary module; and protection signal lines being interposed between the first switches and the second switches.

7. The line module protection device as claimed in claim 5, further comprising a plurality of switches each detachably provided for a corresponding one of the plurality of line accommodating modules, each of said switches selecting one of the line accommodating modules and connecting the selected one to the common auxiliary module.

8. The line module protection device as claimed in claim 5, further comprising a plurality of switches each detachably provided for a corresponding one of lines connected to the line accommodating modules, each of said switches selecting one of the line accommodating modules and connecting the selected one to the common auxiliary module.

* * * * *